D. F. HALLIBURTON.
Fertilizer Distributors.
No. 138,398.          Patented April 29, 1873.
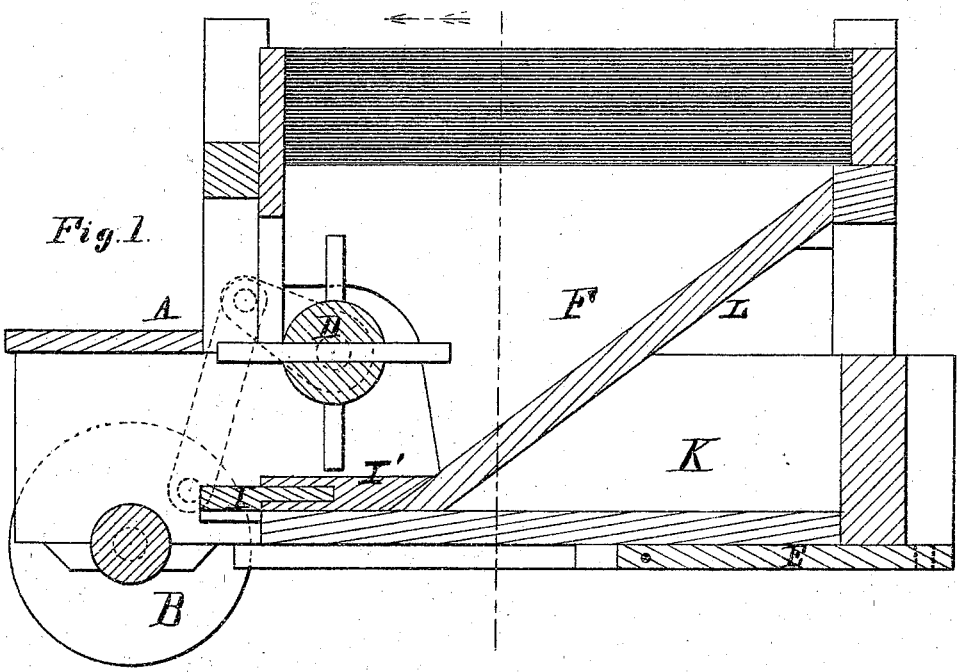
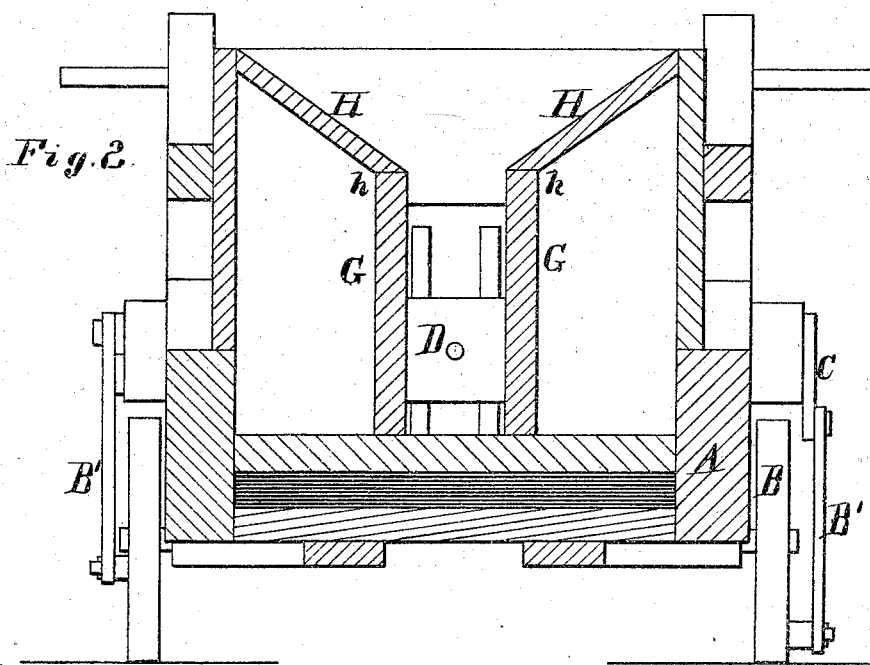

UNITED STATES PATENT OFFICE.

DAVID F. HALLIBURTON, OF RUTHERFORD STATION, TENNESSEE.

IMPROVEMENT IN FERTILIZER-DISTRIBUTERS.

Specification forming part of Letters Patent No. 138,398, dated April 29, 1873; application filed October 26, 1872.

*To all whom it may concern:*

Be it known that I, DAVID F. HALLIBURTON, of Rutherford Station, in the county of Gibson and State of Tennessee, have invented a new and valuable Improvement in Manure Distributer; and I do hereby declare that the following is a full, clear, and exact description of the construction and operation of the same, reference being had to the annexed drawing making a part of this specification, and to the letters and figures of reference marked thereon.

Figure 1 of the drawing is a representation of a longitudinal vertical section of my invention. Fig. 2 is a transverse vertical section of the same.

This invention has relation to manure-drills; and it consists in the construction and novel arrangement of parts, whereby the implement is rendered available to deposit the manure either in drills or broadcast, substantially as hereinafter described.

Referring to the drawing, A designates the frame of the implement, supported at its rear end upon wheels B, which, by means of cranks C and connecting-rods B', operate the studded roller D, whereby the manure is taken from the hopper and conveyed to the ground. The forward part of the implement is supported by having its tongue, E, attached to a wagon or cart, or to the axle of a pair of wheels taken from any vehicle. The studded roller D is situated in the rear end and lower part of the hopper or box F, which is open at this place. The front part L or wall of the hopper is inclined toward the roller, so that the manure may fall that way and be drawn out by said roller. G G designate partitions dividing the hopper into three parts or compartments. For scattering the manure broadcast the three compartments are filled, but for depositing it in single drills or rows the two side compartments are covered by inclined removable boards H, which form sides to the single drill hopper. Cleats $h$, secured to the lower edges of said boards, hold them in place. I designates a V-shaped removable divider, which, by being attached to the cross-beam I', midway between the sides of the machine, causes the manure to fall on either side of the drill. K designates a box or compartment formed in front of the hopper, or underneath its forward inclined wall. This box is designed to contain tools and other articles of general use in connection with the machine.

What I claim as new, and desire to secure by Letters Patent, is—

The manure-distributing machine, constructed as described, having the inclined wall L, vertical partitions G, studded roller D, removable divider I, and the removable sideboards H, substantially as specified.

In testimony that I claim the above I have hereunto subscribed my name in the presence of two witnesses.

DAVID FLETCHER HALLIBURTON.

Witnesses:
J. E. KYZER,
T. D. LITTEN.